United States Patent [19]
Burckardt

[11] 4,203,290
[45] May 20, 1980

[54] STEERING VALVE FOR HYDROSTATIC DRIVE

[75] Inventor: Dieter Burckardt, Schwabisch Gmund, Fed. Rep. of Germany

[73] Assignee: Zahnradfabrik Friedrichschafen, AG., Friedrichshafen, Fed. Rep. of Germany

[21] Appl. No.: 962,109

[22] Filed: Nov. 20, 1978

[30] Foreign Application Priority Data

Nov. 23, 1977 [DE] Fed. Rep. of Germany ....... 2752226

[51] Int. Cl.$^2$ .................. F15B 13/06; F15B 13/09
[52] U.S. Cl. .................. 60/420; 60/486; 137/101; 180/6.48
[58] Field of Search .............. 60/393, 420, 421, 428, 60/429, 449, 486; 180/6.48, 44 F, 66 F; 137/101

[56] References Cited

U.S. PATENT DOCUMENTS

| | | | |
|---|---|---|---|
| 3,306,385 | 2/1967 | Kempson | 180/6.48 |
| 3,795,109 | 3/1974 | Bojas et al. | 60/421 X |

Primary Examiner—Edgar W. Geoghegan
Attorney, Agent, or Firm—Zalkind & Shuster

[57] ABSTRACT

The inflow of fluid from a motor driven pump is divided into two flow streams at a flow rate ratio selectively adjusted through a manually actuated flow divider valve. The adjusted flow rate ratio is maintained constant by a pressure control device within two outflow conduits interconnected by secondary throttling branches to regulate pressure as a function of outflow rates.

5 Claims, 4 Drawing Figures

STEERING VALVE FOR HYDROSTATIC DRIVE

BACKGROUND OF THE INVENTION

This invention relates to a steering valve assembly for a vehicle steering-by-driving system of the type in which a flow divider valve divides the inflow of fluid under manual control to hydraulically adjust the outflow of variable pumps operating fluid drive motors. This application is related by common subject matter to my copending application, Ser. No. 962,631, filed Nov. 21, 1978.

Steering valves have been heretofore devised as simple flow dividers which split a fluid inflow stream into two equal divided flow streams conducted through a pair of flow divider conduits. The pressure distribution between the two flow divider conduits has always been adjusted by separate throttling valves under manual control of a control stick to steer the vehicle. The actuating mechanisms for adjusting the pumps supplying fluid to the fluid drive motors, were set differently by hydraulically operated means to vary the delivery of fluid to the motors and obtain thereby a difference in motor speeds. The foregoing type of known steering valves are, however, expensive because of separate throttle valves and do not exhibit precise regulation.

It is therefore an important object of the present invention to provide a steering valve of relatively simple construction which will provide precise regulation of fluid motors for steering-by-driving operations.

SUMMARY OF THE INVENTION

In accordance with the present invention, a steering control valve assembly includes a housing or valve body mounting therein a flow divider valve having a central portion operatively connected to a manual control. The flow divider valve is thereby displaced to control the relative flow areas of a pair of throttling passages through which divided flow streams are conducted to a pressure operated control device. Secondary throttling passages having fixed flow areas are located downstream of the pressure operated control device, branch off from the divided outflow conduits of the steering valve assembly. The flow rate ratio adjusted through the flow divider valve, is maintained constant by the pressure operated control device even through the inflow rate of fluid changes or pressure changes occur in the flow divider conduits. The secondary throttling passages regulate the pressure in the flow divider conduits as a function of the fluid flow rate in order to effect proper pressure controlled operation of the adjusting mechanism for the pumps that operate the fluid drive motors of the vehicle. Should the speed of the pump driving motor increase, for example, the resulting increase in the inflow rate of fluid to the steering control valve assembly produces a corresponding increase in pressure as a result of the pressure regulating effect of the secondary throttling passages. The motor adjusting pumps are thereby adjusted to a higher output causing an increase in vehicle speed. The outflow of fluid from the secondary throttling passages is preferably conducted to the fluid reservoir tank.

According to one embodiment of the invention, feedback pressure lines extend from the flow divider outflow conduits to pressure chambers exerting reaction pressure forces on the flow divider valve downstream of the pressure operated control device. Therefore, during travel of the vehicle in a curved path occasioned by differential pressures in the the outflow conduits, a resultant back pressure is applied through the flow divider valve to the manually operated valve actuating mechanism to give the vehicle driver a curve travelling sense at the hand steering wheel.

According to another embodiment of the invention, the central portion of the flow divider valve connected to the manually operated actuating mechanism has guide stems projecting axially therefrom on which piston valves are axially shiftable to control the flow areas of the two throttling passages from which the divided flow streams pass. Springs disposed in chambers between pistons connected at opposite axial ends to the guide stems and the piston valves, bias the piston valves against the throttle passage opening bias of the inflow fluid pressure. Compensating pressure lines connect the divided flow lines to the spring enclosing chambers. Thus, the divided flow line pressure and spring force act in opposition to the inflow fluid pressure. Should the initial inflow rate increase, the differential pressures at the throttling passages increase causing the piston valves to axially shift against their spring bias to enlarge the throttling passages. The ratio of the flow areas at the throttling passages will therefore reflect the radius of the curved path being traveled by the vehicle as said ratio approaches one to one. The pressure differential between the flow divider conduits accordingly decreases to increase vehicle speed. Vehicle steering may thereby be effected more precisely, especially in the case of track-laying vehicles whereby abrupt and erratic changes in direction of travel is minimized. The influence of vehicle speed on the steering operation is at the same time maintained.

BRIEF DESCRIPTION OF THE DRAWING FIGURES

DETAILED DESCRIPTION OF PREFERRED EMBODIMENT

Figure 1:
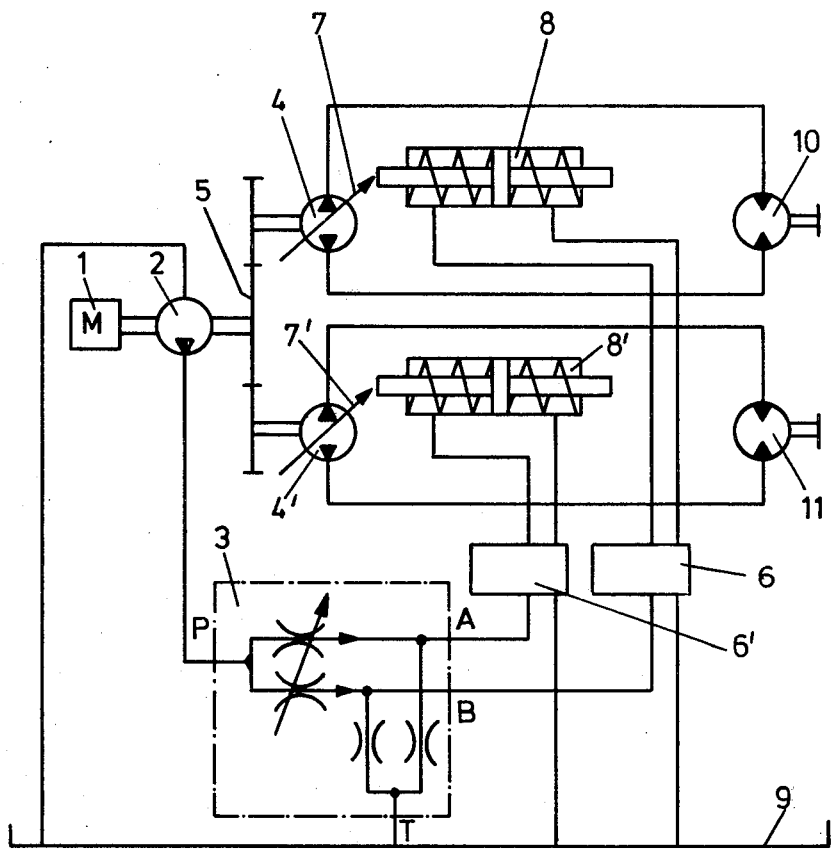
FIG. 1 is a fluid circuit diagram showing the overall hydrostatic drive and steering system of the present invention.

Referring now to the drawings in detail, FIG. 1 schematically illustrates a steering-by-driving system for a motor vehicle having vehicle propelling means on opposite sides adapted to be driven by fluid motors 10 and 11. A steering valve assembly 3 diagrammatically depicted in FIG. 1, is supplied with fluid from a control pump 2 driven by a vehicle drive motor 1. The steering valve assembly 3 forms part of a fluid control circuit through which the quantity of fluid delivered to the fluid drive motors 10 and 11 by two adjusting pumps 4 and 4' is regulated. The adjusting pumps 4 and 4' are drivingly interconnected with the control pump 2 by means of gearing 5 for simultaneous operation. Two steering valves 6 and 6' hydraulically connected to the steering valve assembly 3, control operation of the adjusting pumps for forward and reverse vehicle travel as well as during vehicle standstill. The adjusting pumps are hydraulically controlled by adjusting means which includes control levers 7 and 7' operative to vary the quantity of fluid delivered. The levers 7 and 7' are actuated by means of spring-loaded cylinder-piston units 8 and 8'. Such pump adjusting means are per se known and are supplied with divided flow streams of fluid through lines A and B under control of the steering valve assembly 3 to which an inflow of fluid is conducted by line P from control pump 2. A tank 9 serves as the fluid reservoir and fluid return storage for the hydraulic circuit. The output of the two adjusting pumps 4 and 4' is conducted to the two fluid motors 10 and 11 driving the propelling means on the left and right sides of the vehicle as aforementioned to both propel and steer the vehicle.

Figure 2:
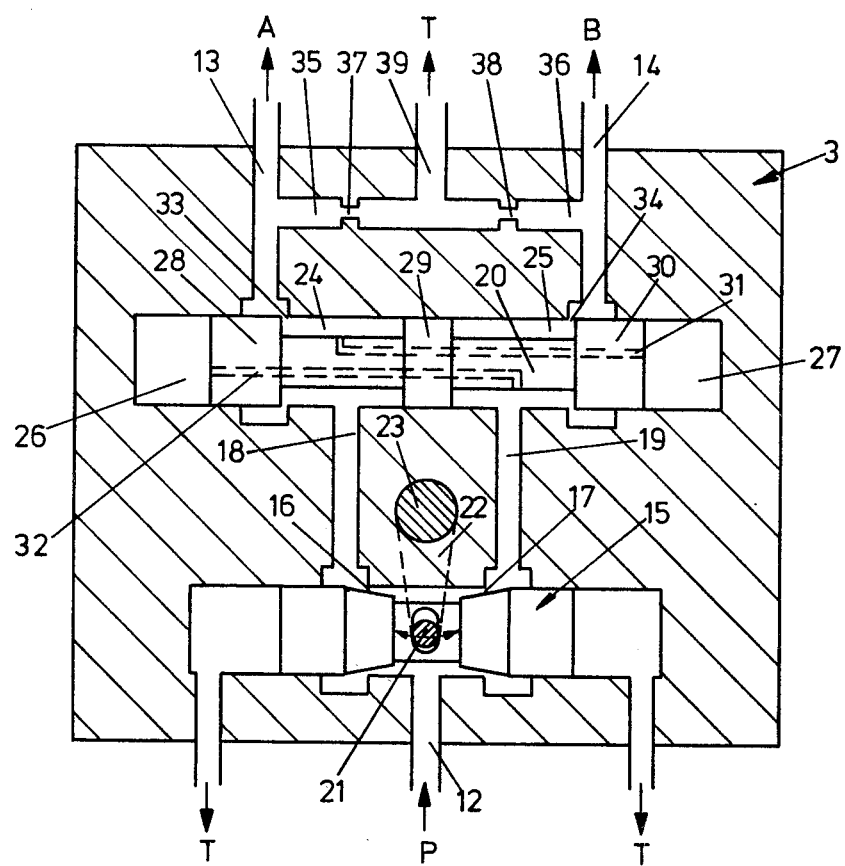
FIG. 2 is a section view through a steering valve assembly utilized in the circuit depicted in FIG. 1.

FIG. 2 illustrates one embodiment of the steering valve assembly 3 in greater detail. The inflow of fluid from the control pump 2 is conducted to the housing of the valve assembly by inlet line 12. Such inflow of fluid at a volumetric flow rate of Q from the control pump 2, is divided into two divided flow streams conducted from the valve assembly by conduits 13 and 14 to lines A and B extending externally from the valve assembly. The outflow of the divided flow streams under volumetric flow rates of $Q_1$ and $Q_2$ occurs at a predetermined flow rate ratio that is maintained constant as will be explained hereinafter.

The flow rate ratio of the divided flow streams is selected through flow divider valve means 15 mounted within the valve assembly housing to control throttling passages 16 and 17 located upstream of divided flow lines 18 and 19 interconnecting the throttling passages with a pressure operated control device 20 through which the division of the inflow stream at a flow rate of Q is effected to form the two individual flow streams having flow rates $Q_1$ and $Q_2$ respectively. Any excess fluid that is not channeled into the divided flow streams by the flow divider valve means 15, is returned to the reservoir tank 9 or the inlet line 12 by means of fluid connections T extending from chambers at opposite axial ends of the flow divider valve means 15.

The flow divider valve means 15 is provided with an actuating mechanism in the form of an elongated opening 21 at the central portion of the valve means within which a pin 21 is guidingly received in order to effect axial shift of the valve means. The pin 21 is connected by a lever 22, shown in dotted lines, to a rotatable shaft 23 which may be the steering shaft or the steering spindle associated with a manual steering control wheel. Rotation of the shaft 23 thus effects axial shift of the valve means 15 producing a change in the cross sectional areas of throttling passages 16 and 17 in order to effect a change in the mutual ratio of the flow rates $Q_1$ and $Q_2$. The foregoing ratio selecting arrangement enables the vehicle to be steered by means of the usual manual steering control instead of a control stick.

The pressure operated control device 20 is provided in order to maintain constant the selected flow rate ratio even when a change occurs in the flow rate Q of the inflow stream and even when changes in fluid resistance occurs. The control device 20 includes two pressure chambers 24 and 25 and two compensating chambers 26 and 27, said chambers being separated from one another by pistons 28, 29 and 30 of the control device 20. The pressure chamber 24 is connected by a passage 31 in the control device to the compensating chamber 27, while a passage 32 interconnects the pressure chamber 25 with the compensating chamber 26. A pair of restrictive passages 33 and 34 interconnect the pressure chambers with the outflow conduits 13 and 14.

The flow rates $Q_1$ and $Q_2$ of the divided outflow streams, conducted to the control piston device 20 by lines 18 and 19, pass through chambers 24 and 25 and the restrictive passages 33 and 34 into the outflow conduits 13 and 14. Depending on the flow area ratio of the throttling passages 16 and 17 as well as the back pressure in the outflow conduits 13 and 14, the pressure control device 20 will assume a certain position to conduct the divided flow streams at the adjusted flow rate ratio. The flow rate ratio is maintained constant by means of the compensating chambers 26 and 27. The pressure of the fluid in the outflow conduits 13 and 14 is regulated by two secondary branch lines 35 and 36 that extend from the outflow conduits 13 and 14 to throttling passages 37 and 38. The secondary throttling passages 37 and 38 conduct a restricted outflow of fluid to the reservoir tank by means of return line 39. As a result of the foregoing secondary throttling passages, any increase in volumetric flow through the outflow conduits 13 and 14 will produce a corresponding increase of pressure therein.

Figure 3:
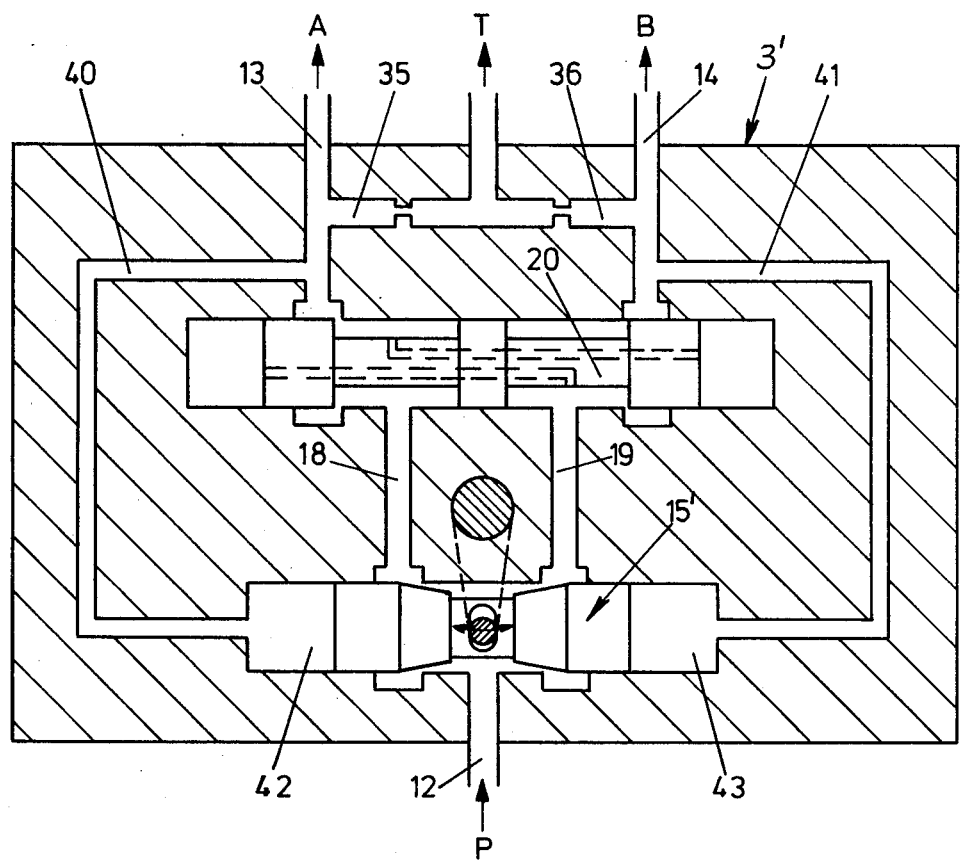
FIG. 3 is a section view showing a modified form of steering valve assembly featuring a reaction force exerting capability.

FIG. 3 illustrates a modified form of steering valve assembly 3' which is basically the same in structure and operation as the valve assembly 3 shown in FIG. 2. The valve assembly 3', however, produces a fluid reaction whenever the vehicle is being steered for travel in a curved path. This is achieved by two feedback pressure signal lines 40 and 41 which interconnect the outflow conduits 13 and 14 with the pressure chambers 42 and 43 disposed at the opposite axial ends of the flow divider valve means 15'. During travel along a curved path, variable pressures will prevail in the outflow conduits 13 and 14. Such variable pressures act on the flow divider valve means 15', through the feedback lines to exert a reaction force on the valve means proportional to the radius of the curved path. Such reaction force is felt by the vehicle's driver through the manual actuating mechanism operatively connected to the central portion of the valve means 15' as hereinbefore indicated with respect to the valve means 15 in FIG. 2.

Figure 4:
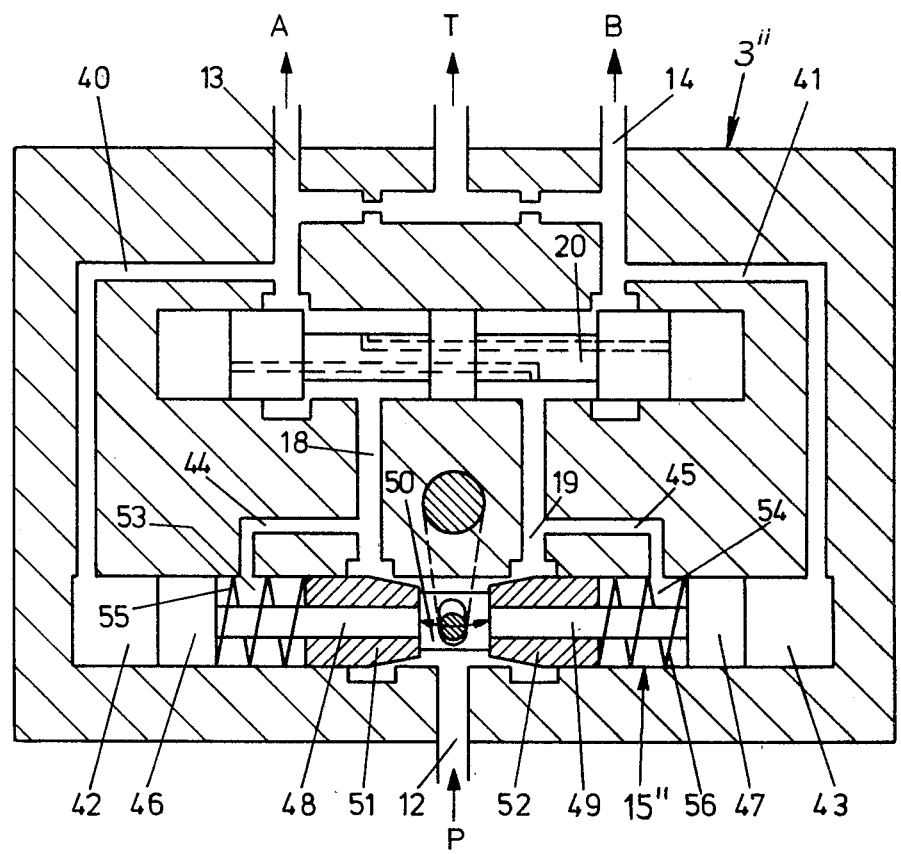
FIG. 4 is a section view showing a further modification of the steering valve assembly of FIG. 3, additionally featuring a vehicle speed influencing capability.

FIG. 4 illustrates a further modified form of steering valve assembly 3" which is basically the same in structure and operation as that shown in FIG. 3. In addition to the fluid reaction feature described in connection with FIG. 3, the valve assembly 3" provides a travel speed influence on the vehicle steering operation. This is achieved by two compensating lines 44 and 45 and a modified form of flow divider valve means 15".

The flow divider valve means 15" has pistons 46 and 47 at each axial end exposed to the reaction force pressures in chambers 42 and 43, said pistons being interconnected by guide stems 48 and 49 with the central portion 50 of the valve means to which the manually operated actuating mechanism is connected. Annular piston valves 51 and 52 are mounted for axial movement independently of each other on the guide stems 48 and 49. Between the piston 46 and piston valve 51 and between the piston 47 and the piston valve 52, there are spring chambers 53 and 54 enclosing springs 55 and 56. The springs and spring enclosing chambers exert a bias on the piston valves 51 and 52 toward the central portion 50 of the valve means opposed by the pressure of the fluid in inlet line 12. When an increase in flow of the inlet flow stream occurs as a result of an increase in vehicle travel speed, the two piston valves 51 and 52 are retracted against the bias of springs 55 and 56 to enlarge the two throttling passages causing the flow rate ratio to approach 1 so that the radius of the curved path tends to increase during rapid vehicle travel.

What is claimed is:

1. A steering valve assembly (3) for a vehicle having a steering-by-driving system, including flow divider valve means (15) through which flow is divided under control of a manually operated actuating mechanism (21-23) to operate adjusting devices (7, 7') for pumps (4, 4') supplying fluid to fluid motors (10 and 11), said flow divider valve means including a central portion connected to the actuating mechanism and throttling passage means (16, 17) for dividing inflow into two divided flow streams, a pair of conduits (13, 14) conducting said divided flow streams to the pump adjusting devices, and means connected to said conduits for maintaining a constant ratio between the flow rates of said divided flow streams, including variable flow restricting passages (33, 34) connected to the conduits downstream of the throttling passage means, and secondary throttling means (37, 38) interconnecting the conduits for regulating pressure therein.

2. The combination of claim 1 including a reservoir tank (9) connected to said secondary throttling means.

3. The combination of claim 1 or 2 including signal feedback means (40, 41) connecting the conduits to the flow divider valve means for exerting a reactive force on the actuating mechanism.

4. The combination of claim 3 wherein said flow divider valve means further includes a pair of pistons (46, 47), a guide stem (48, 49) interconnecting the central portion with said pistons, a pair of piston valves (51, 52) movably mounted on said guide stem to control said throttling passage means, reaction chamber means (42, 43) connected to said signal feedback means for resisting displacement of the flow divider means, biasing means (53, 54) disposed between the pistons and piston valves for urging the piston valves toward the central portion, and compensating means (44, 45) connecting the throttling passage means to the biasing means for varying the bias thereof.

5. For use in a vehicle steering system to which a pair of conduits (13 and 14) are connected for delivering fluid undre pressure from a common source (2) of pressurized fluid, a valve assembly (3) including pressure operated means (20) connected to said conduits for maintaining a constant ratio between flow rates of the fluid in said conduits, manually adjustable valve means (15) operatively connecting the source to the conduits through said pressure operated means for selectively adjusting the flow rate ratio, and regulating means (37, 38) interconnecting the conduits for restrictive outflow therefrom to regulate pressures of the fluid delivered by the conduits as a function of the flow rates.

* * * * *